United States Patent
Xie et al.

(10) Patent No.: US 12,496,710 B2
(45) Date of Patent: Dec. 16, 2025

(54) HUMANOID ROBOT BALANCE CONTROL METHOD, HUMANOID ROBOT, AND STORAGE MEDIUM

(71) Applicant: UBTECH ROBOTICS CORP LTD, Shenzhen (CN)

(72) Inventors: Yan Xie, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 261 days.

(21) Appl. No.: 18/129,909

(22) Filed: Apr. 3, 2023

(65) Prior Publication Data
US 2023/0234222 A1    Jul. 27, 2023

Related U.S. Application Data (63) Continuation of application No. PCT/CN2021/131891, filed on Nov. 19, 2021.

(30) Foreign Application Priority Data

May 28, 2021 (CN) .......................... 202110592574.2

(51) Int. Cl.
  *B25J 9/16* (2006.01)
  *B25J 9/00* (2006.01)

(52) U.S. Cl.
  CPC ............. *B25J 9/163* (2013.01); *B25J 9/0006* (2013.01); *B25J 9/1607* (2013.01); *B25J 9/1651* (2013.01)

(58) Field of Classification Search
  CPC ........ B25J 9/163; B25J 9/0006; B25J 9/1607; B25J 9/1651
  See application file for complete search history.

(56) References Cited

U.S. PATENT DOCUMENTS

| | | | | |
|---|---|---|---|---|
| 2011/0066283 A1* | 3/2011 | Hammam | ............ | B62D 57/032 700/250 |
| 2011/0106309 A1* | 5/2011 | Lim | ...................... | B62D 57/032 700/250 |

(Continued)

FOREIGN PATENT DOCUMENTS

| | | |
|---|---|---|
| CN | 108858208 A | 11/2018 |
| CN | 111872941 A | 11/2020 |
| WO | WO-2021099948 A1 * 5/2021 ............ B25J 9/1607 |

OTHER PUBLICATIONS

Learning_Robust_Task_Priorities_of_QP-Based_Whole-Body_Torque-Controllers (Year: 2018).*

(Continued)

*Primary Examiner* — Mohamad O El Sayah (57) ABSTRACT

A humanoid robot balance control method, a humanoid robot, and a storage medium are provided. The method includes: obtaining a task equation of each of a plurality of deconstructed tasks in a corresponding control cycle by solving a plurality of deconstructed task models using a relevant actual state and a corresponding expected state of the humanoid robot; calculating an optimal solution of a multi-task error optimization function based on each task equation; and generating a joint control instruction of the corresponding control cycle based on the optimal solution in response to the optimal solution being obtained within the corresponding control cycle so as to control corresponding joint(s) to execute the tasks. In such manner, it can ensure that the robot satisfies the necessary constraints while executing multiple tasks, and also comprehensively considers the errors of all the tasks to ensure the execution of all the tasks.

20 Claims, 6 Drawing Sheets

(56) References Cited

U.S. PATENT DOCUMENTS

| | | | | |
|---|---|---|---|---|
| 2012/0004775 A1* | 1/2012 | Andoh | ................... | B25J 9/1633 |
| | | | | 901/47 |
| 2012/0316684 A1* | 12/2012 | Lee | ....................... | G06N 3/008 |
| | | | | 901/1 |
| 2015/0051734 A1* | 2/2015 | Zheng | ................. | B62D 57/032 |
| | | | | 901/1 |
| 2015/0088469 A1* | 3/2015 | Nagarajan | .............. | B25J 9/1671 |
| | | | | 703/2 |
| 2016/0016308 A1* | 1/2016 | Kanazawa | ............. | B25J 9/1607 |
| | | | | 700/263 |

OTHER PUBLICATIONS

Machine translation of CN111872941 (Year: 2020).*
ISR for PCT/CN2021/131891.
Written opinions of ISA for PCT/CN2021/131891.

* cited by examiner

HUMANOID ROBOT BALANCE CONTROL METHOD, HUMANOID ROBOT, AND STORAGE MEDIUM

CROSS REFERENCE TO RELATED APPLICATIONS

The present disclosure is a continuation-application of International Application PCT/CN2021/131891, with an international filing date of Nov. 19, 2021, which claims foreign priority to Chinese Patent Application No. 202110592574.2, filed on May 28, 2021 in the State Intellectual Property Office of China, the contents of all of which are hereby incorporated by reference in its entirety.

BACKGROUND

1. Technical Field

The present disclosure relates to humanoid robot technology, and particularly to a humanoid robot balance control method, a humanoid robot, and a storage medium.

2. Description of Related Art

The balance of a humanoid robot will directly affect its ability to execute other tasks. However, in practical applications, the humanoid robot will inevitably be subject to various disturbances from the external environment. Therefore, it is particularly important to realize the balance control of the humanoid robot under interference.

There are two existing balance control methods for humanoid robots. One is to use a simplified model, while the degrees of freedom of the robots will be wasted and it is often impossible to execute multiple tasks at the same time. The other to use whole body motion control to execute multiple tasks. At present, a null-space projection method is widely used to decouple multiple tasks to be executed, that is, low-priority tasks need to be solved in the null-spaces of high-priority tasks. However, in some cases, low-priority tasks are usually sacrificed to ensure the execution of the high-priority tasks, and often leads to the failure of all the tasks.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

The components of the embodiments of the present disclosure that are described and illustrated in the drawings herein may generally be arranged and designed in a variety of different configurations. Therefore, the following detailed description of the embodiments of the present disclosure provided in the drawings is not intended to limit the scope of the present disclosure, but merely represent the selected embodiments of the present disclosure. Based on the embodiments of the present disclosure, all other embodiments obtained by those of ordinary skill in the art without creative work fall within the protection scope of the present disclosure.

As to the two existing balance control methods for a humanoid robot, taking the first method of simplified model as an example, which locks all joints of the robot except the ankle joint, that is, a single-stage inverted pendulum model is taken as the model of the robot. When a small external disturbance is applied, it only needs to restore the posture balance of the body of the robot by controlling the torque of the ankle joint. It can be seen that although the simplified model can reduce the complexity of the problem, it will cause a waste of the degrees of freedom of the robot because the degrees of freedom of the other joints are not considered at all so that it is impossible to use the redundant degrees of freedom to execute other tasks, and some demands cannot meet in the case of executing multiple tasks.

However, in the second method of whole-body motion control, the balance control is deconstructed into multiple single tasks. Although redundant degrees of freedom can be used to execute multiple tasks, due to the strong coupling characteristics of the interaction between these tasks, that is, the execution effect of one task is often affected by other tasks, a null space projection method is widely used to decouple each task. However, in actual application process, the null space projection method can only guarantee that the execution of high-priority tasks will not be affected. As the number of the tasks increases, the null space of the tasks will become smaller and smaller, which directly leads to that the subsequent low-priority tasks cannot be executed at all. In addition, in some cases, the failures to execute some low-priority tasks may lead to the failures of all the tasks. In addition, this method cannot deal with inequality tasks such as the friction cone constraints on the soles of the robot, while the constraints must be considered in the balance control of the robot.

For this reason, the embodiments of the present disclosure provide a balance control method of a humanoid robot under multi-task and multi-constraint. By considering the balance control in terms of both task and constraint, on the one hand, multi-task deconstruction is carried out, such as sole pose task, linear momentum task, trunk posture task, and sole force task; and on the other hand, multiple constraints are constructed, such as dynamic constraint, friction cone constraint, and CoP (center of pressure) constraint, where the CoP constraint may also be replaced by ZMP (zero moment point) constraint. By constructing a task execution optimization function with multiple tasks and taking each constraint equation as the solution constraint of the optimization function, the joint control instructions corresponding to the solutions obtained by the optimization solving can ensure that the robot can execute multiple tasks simultaneously under the condition of satisfying the constraints, while considering errors for all tasks so as to ensure the execution of all the tasks.

The balance control method of the humanoid robot will be described below in combination with embodiments.

Embodiment 1

Figure 1:
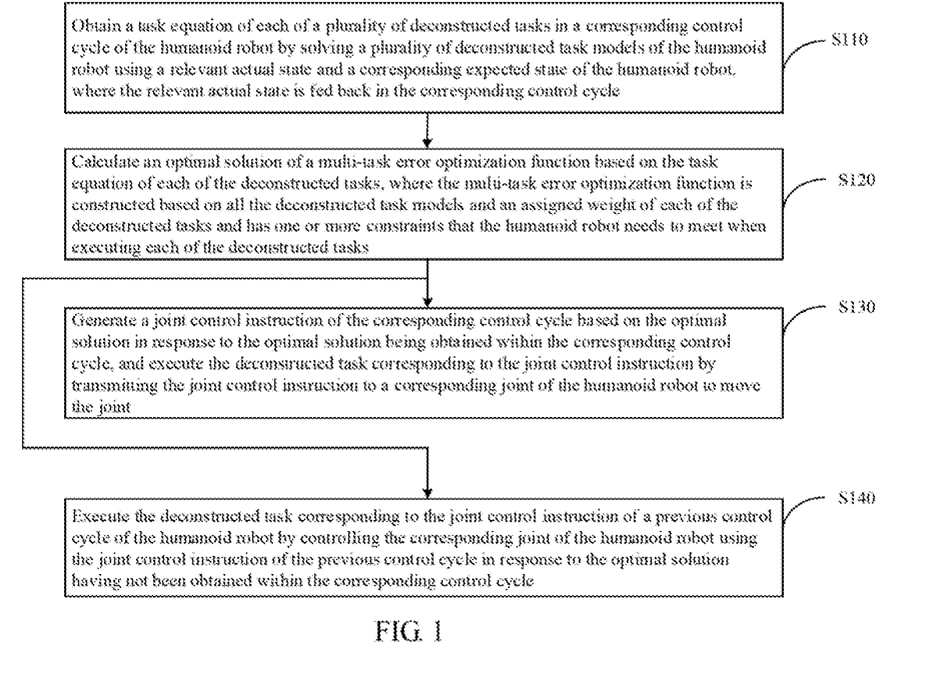
FIG. 1 is a flow chart of a humanoid robot balance control method according to an embodiment of the present disclosure.

FIG. 1 is a flow chart of a humanoid robot balance control method according to an embodiment of the present disclosure. In this embodiment, a humanoid robot balance control method, that is, the balance control method for the humanoid robot is provided, which may be applied to the humanoid robot with force-controlled joints. The humanoid robot may include a trunk, and a left leg and a right leg each having joint(s), where each of the legs has a foot with a sole, and each of the joints is moved by a corresponding motor. The balance control method is a computer-implemented method executable by a processor of the humanoid robot. In other embodiments, the method may be implemented through a humanoid robot balance control apparatus shown in FIG. 6. As shown in FIG. 1, in this embodiment, the humanoid robot can execute multiple tasks at the same time under the condition of satisfying the constraints by deconstructing multiple tasks and establishing multiple constraints for the balance control of the humanoid robot. The balance control method may include the following steps.

S110: obtaining a task equation of each of a plurality of deconstructed tasks in a corresponding control cycle of the humanoid robot by solving a plurality of deconstructed task models of the humanoid robot using a relevant actual state and a corresponding expected state of the humanoid robot, where the relevant actual state is fed back in the corresponding control cycle.

In which, the above-mentioned deconstructed task models may be obtained in advance by deconstructing the humanoid robot into multiple tasks and constructing corresponding task equations. As an example, a plurality of single tasks may be deconstructed according to motion states or forces required by different objects of the humanoid robot such as soles, trunk (torso), centroid (center of mass), arms, and the like. In the case of the sole, for the pose and the force, a sole pose task and a sole force task may be deconstructed; in the case of the trunk, a trunk posture task may be deconstructed; in the case of the centroid of the robot, a linear momentum task may be deconstructed; or in the case of the end of the arm, an arm end pose task, an arm force task, and the like may be deconstructed.

After each deconstructed task is determined, correspondingly, robot equations or constraints of kinematics, dynamics or the like may be constructed according to the objects in each deconstructed task, so as to obtain the above-mentioned deconstructed task model. It should be noted that different deconstructed task models usually contain different variables. Therefore, during solving the deconstructed task model, the required variables related to the robot need to be substituted.

Furthermore, in order to facilitate subsequent optimization calculations, the deconstructed task models obtained above may be represented in a unified form, that is, AiX=bi, where Ai is the task matrix of the i-th deconstructed task, X is the variable to be optimized, and bi is the task vector of the i-th deconstructed task.

For the above-mentioned step S110, as an example, before the balance control, the motion trajectory may be planned, or its expected force may be provided in advance for each deconstructed task, so as to obtain the expected state in each control cycle. Therefore, during the balance control, for each control cycle, according to the corresponding deconstructed task model, the expected state obtained by planning and the actual state obtained by a feedback from, the control system of the humanoid robot may be substituted into the corresponding task model so as to obtain the task equation containing the to-be-solved variables corresponding to each deconstructed task. The actual state may be obtained by calculating feedback information from robot sensors such as joint encoders, inertial measurement units (IMUs), and force sensors.

S120: calculating an optimal solution of a multi-task error optimization function based on the task equation of each of the deconstructed tasks, where the multi-task error optimization function is constructed based on all the deconstructed task models and an assigned weight of each of the deconstructed tasks and has one or more constraints that the humanoid robot needs to meet when executing each of the deconstructed tasks.

In this embodiment, the balance control of the humanoid robot may include a task part and a constraint part, where the task part is used to deconstruct the balance control of the robot into a plurality of single tasks to construct a task model corresponding to each of the tasks, and the constraint part is used to construct constraint equations that the robot needs to satisfy when executing each of the tasks.

In this embodiment, in order to realize the balanced control of multi-task and multi-constraint, will take each task equation as the goal, while the constraint equation is combined to construct an optimization problem for the entirety, that is, the above-mentioned multi-task error optimization function is constructed so that the solving of the optimization problem can make the robot meets the corresponding constraints, while multiple tasks can be executed at the same time as much as possible and the execution of all the tasks can be ensured.

In one embodiment, one multi-task error optimization function is constructed with the goal of minimizing the sum of the errors of the execution of multiple tasks. As an example, before constructing the multi-task error optimization function, an objective function of each single task may be constructed. For instance, it may be constructed using a least squares function, that is, $$\min_X \frac{1}{2} \|AX - b\|^2,$$

where A is a task matrix, X is a to-be-optimized variable, and b is a task vector. Furthermore, when there is more than one task, the objective function of the least squares optimization problem may be expressed as:

$$\min_X \frac{1}{2}\|A_1 X - b_1\|^2 + \frac{1}{2}\|A_2 X - b_2\|^2 + \ldots,$$

here $A_1$ and $A_2$ are task matrices corresponding to different tasks, and $b_1$ and $b_2$ are task vectors corresponding to different tasks.

It is worth noting that, in this embodiment, considering that there are certain differences in the importance of different deconstructed tasks for all the tasks, the execution error of each deconstructed task may be controlled through by adjusting their weights, that is, one weight is assigned to each deconstructed task. Therefore, the task equation for a single deconstructed task will satisfy an equation of:

$$w_i A_i X = w_i b_i;$$

where, w is a weight matrix assigned to the i-th deconstructed task; $A_i$ and $b_i$ represent a task coefficient matrix and the task vector of the i-th deconstructed task, respectively.

Therefore, for m deconstructed tasks, the multi-task error optimization function may be constructed as an equation of:

$$\min_X \frac{1}{2}\sum_{i=1}^{m} w_i^2 \|A_i X - b_i\|^2; \text{ and}$$

$$= \min_X \frac{1}{2} w_1^2 \|A_1 X - b_1\|^2 + \frac{1}{2} w_2^2 \|A_2 X - b_2\|^2 + \ldots + \frac{1}{2} w_m^2 \|A_m X - b_m\|^2.$$

Considering the optimal solving of the multi-task error optimization function, the objective function of the tasks may be transformed into a quadratic optimization function that minimizes the task execution error under linear constraints, so that the existing open-source solver can be used for solution. As an example, the quadratic optimization function may be expressed as an equation of.

$$\min_X \quad \frac{1}{2} X^T H X + g^T X$$
$$\text{s.t.} \quad CX \leq d$$
$$C_{eq} X = d_{eq}$$
$$lb \leq x \leq ub$$

where, X is a to-be-solved variable, $H = A^T A$, $g = -A^T b$, A and b represent the task coefficient matrix and the task vector formed by all the above-mentioned deconstructed tasks, respectively, C and d are the coefficient matrix and the boundary of the inequality constraints in the constraints, respectively, $C_{eq}$ and $d_{eq}$ are the coefficient matrix and the boundary of the equality constraints in the constraints, respectively, and lb and ub are the constraint boundaries of the to-be-solved variable X.

In one embodiment, the constraints that the humanoid robot needs to satisfy when executing each deconstructed task may include a floating-base dynamics equation constraint, a sole force friction cone constraint, a CoP (center of pressure) constraint, and the like. In which, the CoP constraint may also be replaced with a ZMP (zero moment point) constraint. Otherwise, other constraints may also be included.

For the above-mentioned step S120, as an example, after obtaining the task equation corresponding to each deconstructed task of the corresponding control cycle, the task coefficient matrix A and the task vector b of the corresponding control cycle may be determined to substitute into the above-mentioned quadratic optimization function so as to perform optimization solving using an open source solver.

S130: generating a joint control instruction of the corresponding control cycle based on the optimal solution in response to the optimal solution being obtained within the corresponding control cycle, and executing the deconstructed task corresponding to the joint control instruction by transmitting the joint control instruction to a corresponding joint of the humanoid robot to move the joint.

As an example, if the above-mentioned multi-task error optimization function is successfully solved and the solution time is shorter than the control cycle, it means that the obtained solution can satisfy all the linear constraints and minimize the sum of the execution errors of all the tasks. Then, the joint control instruction may be generated by the control system of the humanoid robot based on the optimal solution, for example, for a force-controlled joint, the corresponding joint control instruction is a driving torque. Finally, the joint control instruction may be input into a motor corresponding to the joint so as to control the joint to move, thereby executing the deconstructed task corresponding to the joint control instruction.

For example, for the force-controlled joint, according to a full dynamics model of the robot, the driving torque of the drive-able joint of the humanoid robot satisfies an equation of:

$$\tau = S_a M \ddot{q} + S_a(C+G) - S_a J^T F;$$

where, $S_a$ is a selection matrix of the drive-able joint, M is an inertia matrix, C is a nonlinear vector composed of centrifugal force and Coriolis force, G is a gravity vector, $\ddot{q}$ is a solved angular acceleration of the joint of the humanoid robot, F is a solved external force acting on the humanoid robot that is generally the force acting on the sole of the humanoid robot, and J is a Jacobian matrix of a point of the humanoid robot at which the external force acts on.

In addition, considering that not all cases will be solved successfully, for the case where the solution fails, it can be controlled to remain the current joint state so as to prevent the humanoid robot from being out of balance. Therefore, the balance control method of the humanoid robot may further include:

S140: executing the deconstructed task corresponding to the joint control instruction of a previous control cycle of the humanoid robot by controlling the corresponding joint of the humanoid robot using the joint control instruction of the previous control cycle in response to the optimal solution having not been obtained within the corresponding control cycle.

As an example, if there is no optimal solution or the solution time of the optimal solution exceeds the control cycle, it means that the quadratic optimization problem has no solution or there is an optimal solution but the optimization result cannot be returned within the specified control cycle. At this time, the joint control instruction, for example, the driving torque $\tau_{pre}$ of the previous control cycle will be sent to the motor of the corresponding joint so as to maintain the torque of the joint.

In this embodiment, the balance control method of the humanoid robot takes into account that the humanoid robot needs to ensure its own balance when executing the planned tasks, and then constructs the multi-task error optimization problem by considering tasks and constraints comprehensively, so that the solved optimal solution can ensure that the robot can execute multiple tasks while meet the necessary constraints so as to improve the robustness of the control system of the robot, thereby improving the balance ability of the robot.

Embodiment 2

Figure 2:
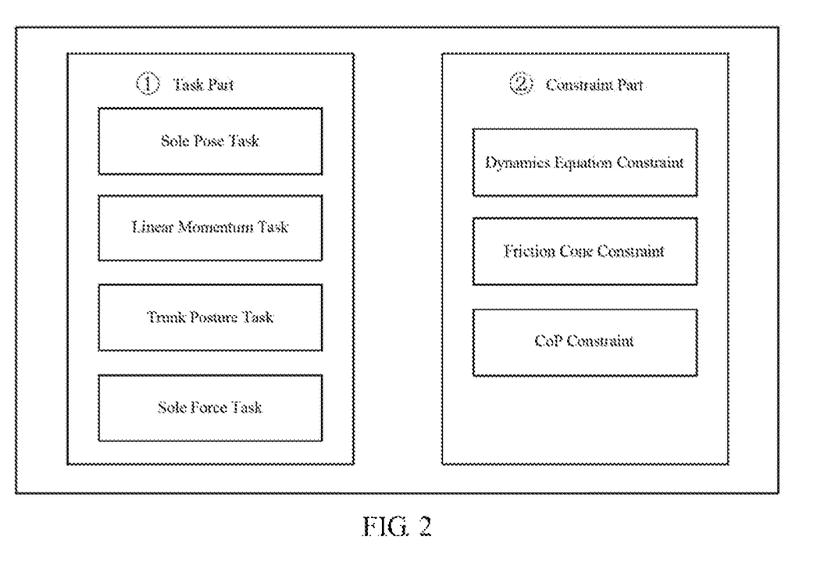
FIG. 2 is a schematic block diagram of an example of task deconstruction according to an embodiment of the present disclosure.

FIG. 2 is a schematic block diagram of an example of task deconstruction according to an embodiment of the present disclosure. As shown in FIG. 2, in this embodiment, based on the method of the above-mentioned embodiment 1, another humanoid robot balance control method that is provided by this embodiment will be described in conjunction with a plurality of deconstructed tasks.

As an example, the humanoid robot has four deconstructed tasks, namely a sole pose task, a sole force task, a linear momentum task, and a trunk posture task. In which, the sole pose task is used to control the sole of the humanoid robot to reach a desired pose; the linear momentum task is used to control the combined centroid of the humanoid robot to achieve a desired state; the trunk posture task is used to control the trunk of the humanoid robot to achieve a desired posture; and the sole force task is used to control a force acting on the sole of the humanoid robot to reach a desired force.

It should be noted that the above-mentioned four deconstructed tasks will be used as the main tasks to realize the balance control of the robot, while the humanoid robot may further have other planning tasks such as force control tasks related to the end of the arm.

In this embodiment, the trunk of the humanoid robot may be used as a floating base so as to represent the state of the trunk, that is, the state of the floating base through 6 virtual joints constructed between the moving trunk and an origin of a world coordinate system. If the number of the joints that can be driven by a motor of the humanoid robot is n, the total number of degrees of freedom of joints is (n+6). It is worth noting that each joint in each joint angular velocity and joint angular acceleration of the humanoid robot mentioned below refers to all joints including virtual joints and drivable joints. The construction of the above-mentioned four deconstructed task models will be described below.

Figure 3:
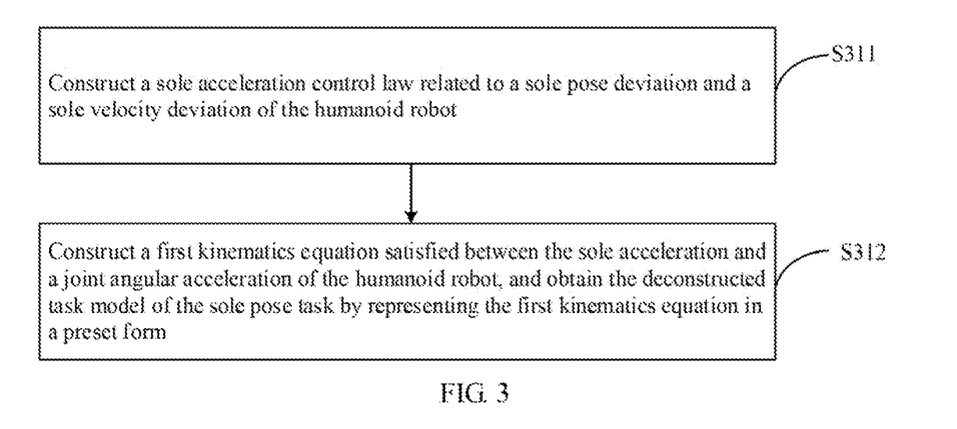
FIG. 3 is a flow chart of the construction process of a sole pose task of the humanoid robot balance control method of FIG. 1.

FIG. 3 is a flow chart of the construction process of a sole pose task of the humanoid robot balance control method of FIG. 1. As shown in FIG. 3, in this embodiment, the construction of the deconstructed task model of the sole pose task may include the following steps.

S311: constructing a sole acceleration control law related to a sole pose deviation and a sole velocity deviation of the humanoid robot, where the sole acceleration control law is for calculating a sole acceleration, the sole pose deviation is a difference between a planned sole pose and an actual feedback sole pose, and the sole velocity deviation is a difference between a planned sole velocity and an actual feedback sole velocity.

S312: constructing a first kinematics equation satisfied between the sole acceleration and a joint angular acceleration of the humanoid robot, and obtaining the deconstructed task model of the sole pose task by representing the first kinematics equation in a preset form (for example, Ax=b). It should be noted that the execution order of steps S311 and S312 is not limited, and may be executed simultaneously or in a set order.

For example, in one embodiment, the sole acceleration control law may be constructed based on PD control as an equation of:

$$a_{F,d} = a_{F,ref} + K_{p1}(r_{F,ref} - r_F) + K_{d1}(v_{F,ref} - v_F);$$

where, $a_{F,d}$ is an expected sole acceleration, $a_{F,ref}$ is a planned sole feedforward acceleration, $r_{F,ref}$ and $v_{F,ref}$ are planned sole pose and planned sole velocity, respectively, $r_F$ and $V_F$ are actual sole pose and actual sole velocity that are fed back, respectively, and $K_{p1}$ are $K_{d1}$ coefficient matrices. It should be noted that the above sole acceleration control law may also be implemented using other controller structures such as PID controller, which can be selected according to actual needs.

At the same time, according to the principle of forward kinematics of the robot, the sole acceleration will satisfy a kinematics equation of:

$$J_F \ddot{q} + \dot{J}_F \dot{q} = a_F;$$

where, $J_F$ is a Jacobian matrix corresponding to the sole of the humanoid robot that has a dimension of 12×(n+6), $\dot{J}_F$ is the derivative of the Jacobian matrix $J_F$, $\dot{q}$ is the angular velocity of the joint of the humanoid robot which is obtained through feedback and has a dimension of (n+6)×1, $\ddot{q}$ is a to-be-solved angular acceleration of the joint of the humanoid robot that has a dimension of (n+6)×1, $a_F$ is a to-be-solved sole acceleration that is a column vector with a dimension of 12×1 and is calculated through the sole acceleration control law, where the first six lines represent the six-dimensional acceleration of the sole of the left leg of the robot, and the last six lines represent the six-dimensional acceleration of the sole of the right leg of the robot, and the six-dimensional acceleration is composed of a three-dimensional linear acceleration and a three-dimensional angular acceleration.

Furthermore, by representing in the form of Ax=b, the deconstructed task model may be obtained as an equation of:

$$[J_F \ 0 \ 0] \begin{bmatrix} \ddot{q} \\ F_L \\ F_R \end{bmatrix} = [a_F - \dot{J}_F \dot{q}];$$

where, $F_L$ and $F_R$ are to-be-solved six-dimensional sole forces of the left leg and the right leg of the robot, respectively.

Figure 4:
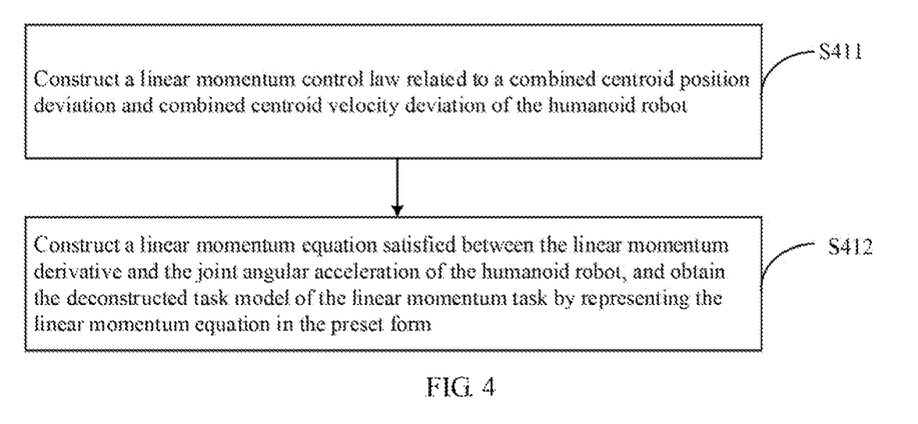
FIG. 4 is a flow chart of the construction process of a linear momentum task of the humanoid robot balance control method of FIG. 1.

FIG. 4 is a flow chart of the construction process of a linear momentum task of the humanoid robot balance control method of FIG. 1. As shown in FIG. 4, in this embodiment, the construction of the deconstructed task model of the linear momentum task may include the following steps.

S411: constructing a linear momentum control law related to a combined centroid position deviation and combined centroid velocity deviation of the humanoid robot, where the linear momentum control law is for calculating a linear momentum derivative of the humanoid robot, the combined centroid position deviation is a difference between a planned combined centroid position and an actual feedback combined centroid position, and the combined centroid velocity deviation is a difference between a planned combined centroid velocity and an actual feedback combined centroid velocity.

S412: constructing a linear momentum equation satisfied between the linear momentum derivative and the joint angular acceleration of the humanoid robot, and obtaining the deconstructed task model of the linear momentum task by representing the linear momentum equation in the preset form.

For example, in one implementation, the linear momentum control law may be constructed based on PD control as an equation of:

$$\dot{h}_{l,d} = \dot{h}_{l,ref} + K_{p2}(r_{CoM,ref} - r_{CoM}) + K_{d2}(v_{CoM,ref} - v_{CoM});$$

where, $\dot{h}_{l,d}$ is an expected linear momentum derivative, $\dot{h}_{l,ref}$ is a linear momentum derivative feedforward amount provided by upper-level planning that has a value of $\dot{h}_{l,ref}=ma_{CoM,ref}$, m is a total mass of the humanoid robot, $a_{CoM,ref}$ is a combined centroid acceleration provided by planning, r and v, are a planned combined centroid position and a planned combined centroid velocity of the human-robot, respectively, $r_{CoM,ref}$ and $v_{CoM,ref}$ are an actual combined centroid position and an actual combined centroid velocity that are obtained through feedback, respectively, each having a dimension of 3×1, $K_{p2}$ and $K_{d2}$ area diagonal square matrices each having a dimension of 3×3 and being a preset coefficient matrix of a PD controller. It should be noted that the above-mentioned linear momentum control law may also be implemented using other controller structures such as PID controller, which can be selected according to actual needs.

According to the theory of robotics, it can be known that the linear momentum derivative of the robot will satisfy a linear momentum equation of:

$$\dot{h}_l = A_{G,l}\ddot{q} + \dot{A}_{G,l}\dot{q};$$

where, $\dot{h}_l$ is the linear momentum derivative of the control system of the robot that has a dimension of 3×1 and can be obtained through the above-mentioned linear momentum control law, $A_{G,l}$ is a momentum matrix with a dimension of 3×(n+6); $\dot{A}_{G,l}$ is a momentum matrix derivative with a dimension of 3×(n+6), $\ddot{q}$ is a to-be-solved angular acceleration of the joint of the robot, and $\dot{q}$ is the angular velocity of the joint of the robot that is fed back in real-time and has a dimension of (n+6)×1.

Furthermore, by representing in the unified form of Ax=b, it may obtain the deconstructed task model as an equation of:

$$[A_{G,i} \quad 0 \quad 0]\begin{bmatrix}\ddot{q} \\ F_L \\ F_R\end{bmatrix} = [\dot{h}_i - \dot{A}_{G,l}\dot{q}].$$

Figure 5:
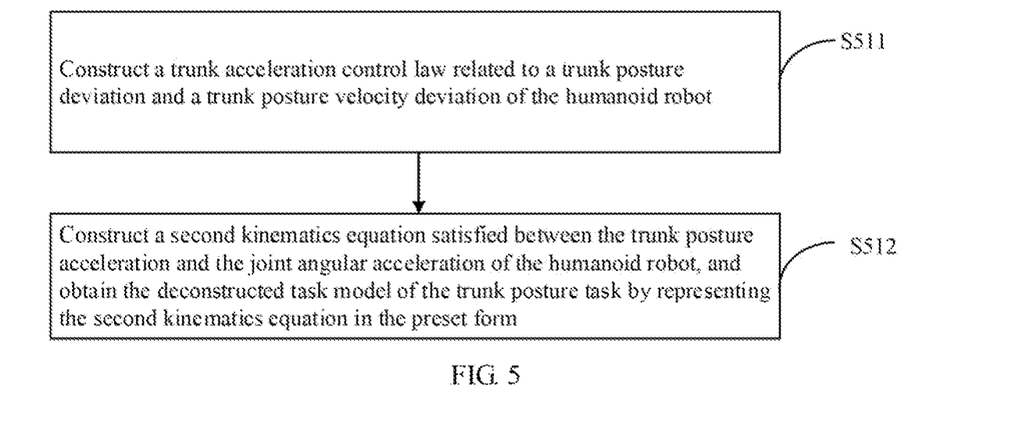
FIG. 5 is a flow chart of the construction process of a trunk posture task of the humanoid robot balance control method of FIG. 1.

FIG. 5 is a flow chart of the construction process of a trunk posture task of the humanoid robot balance control method of FIG. 1. As shown in FIG. 5, in this embodiment, the construction of the deconstructed task model of the trunk posture task may include the following steps.

S511: constructing a trunk acceleration control law related to a trunk posture deviation and a trunk posture velocity deviation of the humanoid robot, where the trunk acceleration control law is for calculating a trunk posture acceleration, the trunk posture deviation is a difference between a planned trunk posture and an actual feedback trunk posture, and the trunk posture velocity deviation is a difference between a planned trunk posture velocity and an actual feedback trunk posture velocity.

S512: constructing a second kinematics equation satisfied between the trunk posture acceleration and the joint angular acceleration of the humanoid robot, and obtaining the deconstructed task model of the trunk posture task by representing the second kinematics equation in the preset form.

For example, in one embodiment, the trunk acceleration control law may be constructed based on PD control as an equation of:

$$a_{T,d}=a_{T,ref}+K_{p3}(r_{T,ref}-r_T)+K_{d3}(v_{T,ref}-v_T);$$

where, $a_{T,d}$ is an expected trunk posture acceleration, $a_{T,ref}$ is a trunk posture feedforward acceleration planned by upper level, $r_{T,ref}$ and $v_{T,ref}$ are a trunk posture and a planned trunk posture velocity, respectively, that are planned by upper level, $r_T$ and $v_T$ are an actual trunk posture and an actual trunk posture velocity, respectively, that are planned by feeding back and each has a dimension of 3×1, and $K_{p3}$, and $K_{d3}$ are the coefficient matrices each having a dimension of 3×3 that are coefficient matrices representing PD controller. It should be noted that the above-mentioned trunk acceleration control law may also be implemented using other controller structures such as PID controller, which can be selected according to actual needs.

At the same time, according to robot dynamics, it can be known that the trunk posture acceleration may be represented as an equation of:

$$J_T\ddot{q}+\dot{J}_T\dot{q}=a_T;$$

where, $a_T$ is a column vector with a dimension of 3×1 that represents the trunk posture acceleration of the robot, $J_T$ is a Jacobian matrix corresponding to the trunk posture of the robot that has a dimension of 3×(n+6), $\dot{J}_T$ is a Jacobian matrix derivative corresponding to the trunk posture of the robot that has a dimension of 3×(n+6), $\ddot{q}$ is a to-be-optimized angular acceleration of the joint of the robot that has a dimension of (n+6)×1, and $\dot{q}$ is an angular velocity of the joint of the robot that is fed back at the current moment and has a dimension of (n+6)×1.

Usually, the objective of the sole force task is to make the force acting on the sole as far as possible to achieve the desired sole force. As an example, the construction of the deconstructed task model of the sole force task may include: constructing a sole force equation of each of the left leg and the right leg so that actual sole force is equal to expected sole force, and obtaining the deconstructed task model of the sole force task by representing the sole force equation of each of the left leg and the right leg in the preset form.

Therefore, the sole force of the left leg and that of the right leg will satisfy equations of:

$$F_L=F_{L,ref};$$

$$F_R=F_{R,ref};$$

where, $F_L$ and $F_R$ are to-be-solved six-dimensional sole forces of the left leg and the right legs of the humanoid robot each having a dimension of 6×1, and $F_{L,ref}$ and $F_{R,ref}$ are six-dimensional sole forces of the left leg and the right legs of the humanoid robot that are planned by upper level and each has a dimension of 6×1;

In addition, by representing in the unified form of Ax=b, it may obtain the deconstructed task model as an equation of:

$$\begin{bmatrix}0 & I & 0 \\ 0 & 0 & I\end{bmatrix}\begin{bmatrix}\ddot{q} \\ F_L \\ F_R\end{bmatrix} = \begin{bmatrix}F_{L,ref} \\ F_{R,ref}\end{bmatrix}.$$

It should be noted that during performing the balance control, the corresponding state variables are substituted into the corresponding deconstructed task models to obtain the task equations of each control cycle, where the task equation will include the corresponding task coefficient matrix and task vector. Furthermore, all the task coefficient matrices and task vectors are substituted into the above-mentioned multi-task error optimization function for optimal solving.

In addition, as shown in FIG. 3, in this embodiment, in addition to the above-mentioned four deconstructed tasks, the optimization function will have a floating base dynamics equation constraint, a sole force friction cone constraint, and a CoP constraint. The construction of the three constraints is described below.

It should be understood that the above-mentioned six virtual joints do not generate moments. Therefore, for a serial robot system with a floating base, for example, the humanoid robot, its full dynamics model may be represented as an equation of:

$$M\ddot{q}+C+G=S_a^T\tau+J^TF;$$

where, F is the to-be-solved external force acting on the humanoid robot, and is mainly the force acting on the sole herein. As an example, the force acting on the sole may be represented as an equation of $$F = \begin{bmatrix} F_L \\ F_R \end{bmatrix}$$

that has an dimension of 12×1; J is a Jacobian matrix of points of the humanoid robot that external forces acting on, which is in the form as an equation of $$J = \begin{bmatrix} J_L \\ J_R \end{bmatrix}$$

and has an dimension of 12×(n+6), and includes a Jacobian matrix $J_L$ of the points of the left leg that the external forces acting on and a Jacobian matrix $J_R$ of the points of the right leg that the external forces acting on.

Furthermore, by multiplying a selection matrix $S_f$ of the floating base to the left, it may obtain a dynamics equation of the floating base as:

$$S_fM\ddot{q}+S_fC+S_fG=S_fJ^TF.$$

For example, a selection matrix $S_a$ of the drive-able joint may be $S_a=[0_{6\times6}\ I_{6\times n}]$, selection matrix $S_f$ of the floating base may be $S_f=[I_{6\times6}\ 0_{6\times n}]$, and the two selection matrices may satisfy $S_fS_a^T=[0_{6\times6}]$. Furthermore, the dynamic equation of the floating base may be obtained according to the form of the equation constraint in the quadratic optimization function in the above-mentioned embodiment 1.

For the friction cone constraint of the above-mentioned force acting on the sole, it should be satisfied that when the sole does not slide relative to the ground, the vector direction of the force acting on the sole has to be within a cone as an equation of:

$$\sqrt{F_x^2+F_y^2}\leq F_z;$$

$$F_z\geq 0$$

where, $F_x$, $F_y$, $F_z$ are components of a sole force vector F on the x, y, and z axes, respectively. Similarly, they may be obtained according to the form of the inequality constraint in the quadratic optimization function in the above-mentioned embodiment 1, so as to obtain the corresponding linear inequality expression.

Similarly, for the above-mentioned CoP constraint, it should be satisfied that when the sole of the robot is in contact with the ground, the position of the CoP has to be within the support domain of the sole, which may be expressed mathematically as equations of:

$$d_{x,min} \leq \frac{-\tau_y}{F_z} \leq d_{x,max}$$
$$d_{y,min} \leq \frac{\tau_x}{F_z} \leq d_{y,max} \quad ;$$

where, $d_{x,min}$ and $d_{x,max}$ are the upper and lower boundaries of the sole support domain in the x direction, respectively, $d_{y,min}$ and $d_{y,max}$ are the upper and lower boundaries of the sole support domain in the y direction, respectively, and $\tau_x$, $\tau_y$ are the components of the sole moment vectors on the x and y axes, respectively. It should be noted that the three constraints listed herein are only examples and not limited thereto.

In this embodiment, the balance control is deconstructed to obtain four single tasks and construct the three constraints that the robot needs to satisfy in executing the above-mentioned deconstructed tasks so as to optimize the solution of the sole force and the joint angular acceleration, so that the obtained joint control instructions can ensure that the robot executes multiple tasks with the index of the minimum sum of the task errors under the condition of satisfying the constraints.

Embodiment 3

Figure 6:
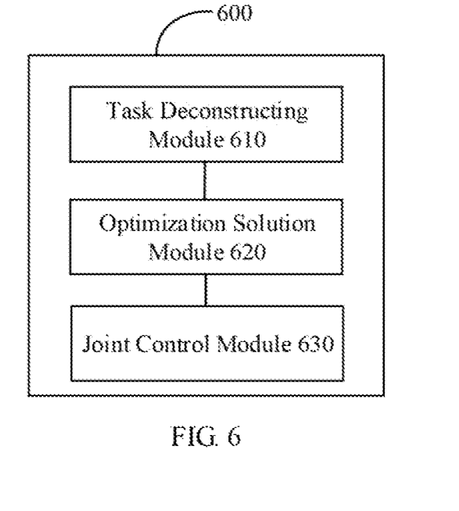
FIG. 6 is a schematic block diagram of a humanoid robot balance control apparatus according to an embodiment of the present disclosure.

FIG. 6 is a schematic block diagram of a humanoid robot balance control apparatus according to an embodiment of the present disclosure. As shown in FIG. 6, in this embodiment, a balance control apparatus 600 for a humanoid robot is provided based on the method of the above-mentioned embodiment 1. As an example, the balance control apparatus 600 may include:

a task deconstructing module 610 configured to obtain a task equation of each of a plurality of deconstructed tasks in a corresponding control cycle of the humanoid robot by solving a plurality of deconstructed task models of the humanoid robot using a relevant actual state and a corresponding expected state of the humanoid robot, where the relevant actual state is fed back in the corresponding control cycle;

an optimization solution module 620 configured to calculate an optimal solution of a multi-task error optimization function based on the task equation of each of the deconstructed tasks, where the multi-task error optimization function is constructed based on all the deconstructed task models and an assigned weight of each of the deconstructed tasks and has one or more constraints that the humanoid robot needs to meet when executing each of the deconstructed tasks; and a joint control module 630 configured to generate a joint control instruction of the corresponding control cycle based on the optimal solution in response to the optimal solution being obtained within the corresponding control cycle, and execute the deconstructed task corresponding to the joint control instruction by transmitting the joint control instruction to a corresponding joint of the humanoid robot to move the joint.

In addition, the joint control module 630 may further configured to execute the deconstructed task corresponding to the joint control instruction of a previous control cycle of the humanoid robot by controlling the corresponding joint of the humanoid robot using the joint control instruction of the previous control cycle in response to the optimal solution having not been obtained within the corresponding control cycle In this embodiment, it should be noted that the apparatus corresponds to the method in the above-mentioned embodiment 1, hence the options in the above-mentioned embodiment 1 are also applicable to this embodiment, so the description will not be repeated herein.

The embodiments of the present disclosure further provide a humanoid robot. As an example, the humanoid robot may include a processor and a storage (e.g., a memory), where the storage stores computer program(s). The processor executes the computer program(s) so that the humanoid robot performs the above-mentioned humanoid robot balance control method or the function of each module in the humanoid robot balance control apparatus.

The present disclosure also provides a non-transitory computer readable storage medium for storing the computer program used in the above-mentioned humanoid robot.

In the embodiments of the present disclosure, it should be understood that the disclosed method and apparatus may be implemented in other manners. The above-mentioned apparatus embodiment is merely illustrative, for example, the flow charts and structural diagrams in the drawings show the architecture, functions and operations that are possible to be implemented by the apparatus, method and computer program products of the embodiments. In this regard, each block in the flowchart or block diagram may represent a module, a program segment, or a part of codes that include one or more computer executable instructions for implementing specified logical functions. It should also be noted that, in alternative implementations, the functions noted in the blocks may occur out of the order noted in the figures. For example, two blocks in succession may, in fact, be executed substantially concurrently, or may sometimes be executed in the reverse order, depending upon the functionality involved. It is also to be noted that each block in the block diagrams and/or flow charts, and the combination of blocks in the block diagrams and/or flow charts, may be implemented by a dedicated hardware-based system for performing the specified function or action, or may be implemented by a combination of special purpose hardware and computer instructions.

In addition, each functional module or unit in each embodiment of the present disclosure may be integrated to form an independent part, each module or unit may exist independently, or two or more modules or units may be integrated to form an independent part.

The functions can be stored in a computer readable storage medium if it is implemented in the form of a software functional unit and sold or utilized as a separate product. Based on this understanding, the technical solution of the present disclosure, either essentially or in part, contributes to the prior art, or a pan of the technical solution can be embodied in the form of a software product. The software product is stored in a storage medium, which includes a number of instructions for enabling a computer device (which can be a smart phone, a personal computer, a server, a network device, etc.) to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The forgoing is only the specific embodiment of the present disclosure, while the scope of the present disclosure is not limited thereto. For those skilled in the art, modifications or replacements that can be easily conceived within the technical scope of the present disclosure should be included within the scope of the present disclosure.

What is claimed is:

1. A computer-implemented balance control method for a humanoid robot, comprising:

obtaining a task equation of each of a plurality of deconstructed tasks in a corresponding control cycle of the humanoid robot by solving a plurality of deconstructed task models of the humanoid robot using a relevant actual state and a corresponding expected state of the humanoid robot, wherein the relevant actual state is fed back, by the humanoid robot, in the corresponding control cycle;

calculating an optimal solution of a multi-task error optimization function based on the task equation of each of the deconstructed tasks, wherein the multi-task error optimization function is constructed based on all the deconstructed task models and an assigned weight of each of the deconstructed tasks and has one or more constraints that the humanoid robot needs to meet when executing each of the deconstructed tasks; and generating a joint control instruction of the corresponding control cycle based on the optimal solution in response to the optimal solution being obtained within the corresponding control cycle, and executing the deconstructed task corresponding to the joint control instruction by transmitting the joint control instruction to a corresponding joint of the humanoid robot to move the joint;

wherein the humanoid robot has four deconstructed tasks including a sole pose task, a linear momentum task, a trunk posture task and a sole force task each has a deconstructed task model; and wherein the deconstructed task model of the sole pose task is constructed in advance by:

constructing a sole acceleration control law related to a sole pose deviation and a sole velocity deviation of the humanoid robot, wherein the sole acceleration control law is for calculating a sole acceleration, the sole pose deviation is a difference between a planned sole pose and an actual feedback sole pose, and the sole velocity deviation is a difference between a planned sole velocity and an actual feedback sole velocity; and constructing a first kinematics equation satisfied between the sole acceleration and a joint angular acceleration of the humanoid robot, obtaining the deconstructed task model of the sole pose task by representing the first kinematics equation in a preset form, wherein the joint angular acceleration and the sole force are represented as a to-be-optimized variable in the preset form.

2. The method of claim 1, wherein the first kinematics equation is:

$$J_F\ddot{q}+\dot{J}_F\dot{q}=a_F;$$

where, $J_F$ is a Jacobian matrix corresponding to a sole of the humanoid robot, $\dot{J}_F$ is a derivative of the Jacobian matrix $J_F$, $\dot{q}$ is a feedback joint angular velocity of the humanoid robot, $\ddot{q}$ is an angular acceleration of each joint of the humanoid robot, and $a_F$ is a sole acceleration calculated using the sole acceleration control law; and wherein, the sole acceleration control law satisfies an equation of:

$$a_{F,d}=a_{F,ref}+K_{pl}(r_{F,ref}-r_F)+K_{d1}(v_{F,ref}-v_F);$$

where, $a_{F,d}$ is an expected sole acceleration, $a_{F,ref}$ is a planned sole feedforward acceleration, $r_{F,ref}$ is a planned sole pose, $v_{F,ref}$ is a planned sole velocity, $r_F$ is an actual feedback sole pose, $v_F$ is an actual feedback sole velocity, and $K_{p1}$ and $K_{d1}$ are coefficient matrices.

3. The method of claim 1, wherein the deconstructed task model of the linear momentum task is constructed in advance by:
constructing a linear momentum control law related to a combined centroid position deviation and combined centroid velocity deviation of the humanoid robot, wherein the linear momentum control law is for calculating a linear momentum derivative of the humanoid robot, the combined centroid position deviation is a difference between a planned combined centroid position and an actual feedback combined centroid position, and the combined centroid velocity deviation is a difference between a planned combined centroid velocity and an actual feedback combined centroid velocity; and
constructing a linear momentum equation satisfied between the linear momentum derivative and the joint angular acceleration of the humanoid robot, and obtaining the deconstructed task model of the linear momentum task by representing the linear momentum equation in the preset form.

4. The method of claim 3, wherein the deconstructed task model of the linear momentum task is as an equation of:

$$\dot{h}_l = A_{G,l}\ddot{q} + \dot{A}_{G,l}\dot{q};$$

where, $A_{G,l}$ is a momentum matrix, $\dot{A}_{G,l}$ is a derivative of the momentum matrix, $\ddot{q}$ is the joint angular acceleration of the humanoid robot, $\dot{q}$ is a feedback joint angular velocity of the humanoid robot, $\dot{h}_l$ is the linear momentum derivative of the humanoid robot calculated using the linear momentum control law; and
wherein the linear momentum control law satisfies an equation of:

$$\dot{h}_{l,d} = \dot{h}_{l,ref} + K_{p2}(r_{CoM,ref} - r_{CoM}) + K_{d2}(v_{CoM,ref} - v_{CoM});$$

where, $\dot{h}_{l,d}$ is an expected linear momentum derivative, $\dot{h}_{l,ref}$ is a planned feedforward amount of linear momentum derivative, $r_{CoM,ref}$ is a planned combined centroid position of the humanoid robot, and $v_{CoM,ref}$ is a planned combined centroid velocity of the humanoid robot, $r_{CoM}$ is an actual feedback combined centroid position, $v_{CoM}$ is an actual feedback combined centroid velocity, and $K_{p2}$ and $K_{d2}$ are coefficient matrices.

5. The method of claim 1, wherein a trunk posture of the humanoid robot is represented by a state of a plurality of virtual joints constructed between a trunk of the humanoid robot and a world coordinate system origin, and the deconstructed task model of the trunk posture task is constructed in advance by:
constructing a trunk acceleration control law related to a trunk posture deviation and a trunk posture velocity deviation of the humanoid robot, wherein the trunk acceleration control law is for calculating a trunk posture acceleration, the trunk posture deviation is a difference between a planned trunk posture and an actual feedback trunk posture, and the trunk posture velocity deviation is a difference between a planned trunk posture velocity and an actual feedback trunk posture velocity; and
constructing a second kinematics equation satisfied between the trunk posture acceleration and the joint angular acceleration of the humanoid robot, and obtaining the deconstructed task model of the trunk posture task by representing the second kinematics equation in the preset form.

6. The method of claim 5, wherein the second kinematics equation is:

$$J_T\ddot{q} + \dot{J}_T\dot{q} = a_T;$$

where, $J_T$ is a Jacobian matrix corresponding to the trunk posture of the humanoid robot, $\dot{J}_T$ is a derivative of the Jacobian matrix $J_T$, $\dot{q}$ is a feedback joint angular velocity of the humanoid robot, $\ddot{q}$ is the joint angular acceleration of the humanoid robot, and $a_T$ is the trunk posture acceleration calculated using the trunk acceleration control law; and
the trunk acceleration control law satisfies an equation of:

$$a_{T,d} = a_{T,ref} + K_{p3}(r_{T,ref} - r_T) + K_{d3}(v_{T,ref} - v_T);$$

where, $a_{T,d}$ is an expected trunk posture acceleration, $a_{T,ref}$ is a planned trunk posture feedforward acceleration, $r_{T,ref}$ is a planned trunk posture, $v_{T,ref}$ is a planned trunk posture velocity, $r_T$ an actual feedback trunk posture, $v_T$ is an actual feedback trunk posture velocity, and $K_{p3}$ and $K_{d3}$ are the coefficient matrices.

7. The method of claim 1, wherein the humanoid robot has a left leg and a right leg, and the deconstructed task model of the sole force task is constructed in advance by:
constructing a sole force equation of each of the left leg and the right leg so that actual sole force is equal to expected sole force, and obtaining the deconstructed task model of the sole force task by representing the sole force equation of each of the left leg and the right leg in the preset form.

8. The method of claim 1, wherein a constraint that the humanoid robot needs to satisfy when executing each of the deconstructed tasks includes one of a constraint of a floating-base dynamics equation, a constraint of sole force friction cone, a constraint of pressure center, and a constraint of zero moment point;
wherein, a trunk of the humanoid robot is used as a floating base, and the floating-base dynamics equation is:

$$S_f M\ddot{q} + S_f C + S_f G = S_f J_F^T F;$$

where, $S_f$ is a select matrix of the floating base, M is an inertia matrix, C is a nonlinear vector composed of centrifugal force and Coriolis force, G is a gravity vector, $\ddot{q}$ is the joint angular acceleration of the humanoid robot, F is a sole force of the humanoid robot, and $J_F$ is a Jacobian matrix corresponding to a sole of the humanoid robot.

9. The method of claim 1, wherein the multi-task error optimization function is constructed using a least square method function as an equation of:

$$\min_X \frac{1}{2} \sum_{i=1}^{m} w_i^2 \|A_i X - b_i\|^2;$$

where, the task equation of the i-th deconstructed task is expressed as an equation of $w_i A_i X = w_i b_i$, $w_i$ is a distribution weight matrix of the i-th deconstructed task, $A_i$ is a task coefficient matrix of the i-th deconstructed task, $b_i$ is a task vector of the i-th deconstructed task, X is a to-be-optimized variable, and m is a total number of the deconstructed tasks.

10. A humanoid robot, comprising:
a processor;
a memory coupled to the processor; and
one or more computer programs stored in the memory and executable on the processor;
wherein, the one or more computer programs comprise:
instructions for obtaining a task equation of each of a plurality of deconstructed tasks in a corresponding control cycle of the humanoid robot by solving a plurality of deconstructed task models of the humanoid robot using a relevant actual state and a corresponding expected state of the humanoid robot, wherein the relevant actual state is fed back, by the humanoid robot, in the corresponding control cycle;
instructions for calculating an optimal solution of a multi-task error optimization function based on the task equation of each of the deconstructed tasks, wherein the multi-task error optimization function is constructed based on all the deconstructed task models and an assigned weight of each of the deconstructed tasks and has one or more constraints that the humanoid robot needs to meet when executing each of the deconstructed tasks; and
instructions for generating a joint control instruction of the corresponding control cycle based on the optimal solution in response to the optimal solution being obtained within the corresponding control cycle, and executing the deconstructed task corresponding to the joint control instruction by transmitting the joint control instruction to a corresponding joint of the humanoid robot to move the joint;
wherein the humanoid robot has four deconstructed tasks including a sole pose task, a linear momentum task, a trunk posture task and a sole force task each has a deconstructed task model; and wherein the deconstructed task model of the sole pose task is constructed in advance by:
constructing a sole acceleration control law related to a sole pose deviation and a sole velocity deviation of the humanoid robot, wherein the sole acceleration control law is for calculating a sole acceleration, the sole pose deviation is a difference between a planned sole pose and an actual feedback sole pose, and the sole velocity deviation is a difference between a planned sole velocity and an actual feedback sole velocity; and
constructing a first kinematics equation satisfied between the sole acceleration and a joint angular acceleration of the humanoid robot, obtaining the deconstructed task model of the sole pose task by representing the first kinematics equation in a preset form, wherein the joint angular acceleration and the sole force are represented as a to-be-optimized variable in the preset form.

11. The humanoid robot of claim 10, wherein the first kinematics equation is:

$$J_F\ddot{q}+\dot{J}_F\dot{q}=a_F;$$

where, $J_F$ is a Jacobian matrix corresponding to a sole of the humanoid robot, $\dot{J}_F$ is a derivative of the Jacobian matrix $J_F$, $\dot{q}$ is a feedback joint angular velocity of the humanoid robot, $\ddot{q}$ is an angular acceleration of each joint of the humanoid robot, and $a_F$ is a sole acceleration calculated using the sole acceleration control law; and
wherein, the sole acceleration control law satisfies an equation of:

$$a_{F,d}=a_{F,ref}+K_{p1}(r_{F,ref}-r_F)+K_{d1}(v_{F,ref}-v_F);$$

where, $a_{F,d}$ is an expected sole acceleration, $a_{F,ref}$ is a planned sole feedforward acceleration, $r_{F,ref}$ is a planned sole pose, $v_{F,ref}$ is a planned sole velocity, $r_F$ is an actual feedback sole pose, VF is an actual feedback sole velocity, and $K_{p1}$ and $K_{d1}$ are coefficient matrices.

12. The humanoid robot of claim 10, wherein the deconstructed task model of the linear momentum task is constructed in advance by:
constructing a linear momentum control law related to a combined centroid position deviation and combined centroid velocity deviation of the humanoid robot, wherein the linear momentum control law is for calculating a linear momentum derivative of the humanoid robot, the combined centroid position deviation is a difference between a planned combined centroid position and an actual feedback combined centroid position, and the combined centroid velocity deviation is a difference between a planned combined centroid velocity and an actual feedback combined centroid velocity; and
constructing a linear momentum equation satisfied between the linear momentum derivative and the joint angular acceleration of the humanoid robot, and obtaining the deconstructed task model of the linear momentum task by representing the linear momentum equation in the preset form.

13. The humanoid robot of claim 12, wherein the deconstructed task model of the linear momentum task is as an equation of:

$$\dot{h}_l=A_{G,l}\ddot{q}+\dot{A}_{G,l}\dot{q};$$

where, $A_{G,l}$ is a momentum matrix, $\dot{A}_{G,l}$ is a derivative of the momentum matrix, $\ddot{q}$ is the joint angular acceleration of the humanoid robot, $\dot{q}$ is a feedback joint angular velocity of the humanoid robot, $\dot{h}_l$ is the linear momentum derivative of the humanoid robot calculated using the linear momentum control law; and
wherein the linear momentum control law satisfies an equation of:

$$\dot{h}_{l,d}=\dot{h}_{l,ref}+K_{p2}(r_{CoM,ref}-r_{CoM})+K_{d2}(v_{CoM,ref}-v_{CoM});$$

where, $\dot{h}_{l,d}$ is an expected linear momentum derivative, $\dot{h}_{l,ref}$ is a planned feedforward amount of linear momentum derivative, $r_{CoM,ref}$ is a planned combined centroid position of the humanoid robot, and $v_{CoM,ref}$ is a planned combined centroid velocity of the humanoid robot, $r_{CoM}$ is an actual feedback combined centroid position, $v_{CoM}$ is an actual feedback combined centroid velocity, and $K_{p2}$ and $K_{d2}$ are coefficient matrices.

14. The humanoid robot of claim 10, wherein a trunk posture of the humanoid robot is represented by a state of a plurality of virtual joints constructed between a trunk of the humanoid robot and a world coordinate system origin, and the deconstructed task model of the trunk posture task is constructed in advance by:
constructing a trunk acceleration control law related to a trunk posture deviation and a trunk posture velocity deviation of the humanoid robot, wherein the trunk acceleration control law is for calculating a trunk posture acceleration, the trunk posture deviation is a difference between a planned trunk posture and an actual feedback trunk posture, and the trunk posture velocity deviation is a difference between a planned trunk posture velocity and an actual feedback trunk posture velocity; and
constructing a second kinematics equation satisfied between the trunk posture acceleration and the joint angular acceleration of the humanoid robot, and obtaining the deconstructed task model of the trunk posture task by representing the second kinematics equation in the preset form.

15. The humanoid robot of claim 14, wherein the second kinematics equation is:

$$J_T \ddot{q} + \dot{J}_T \dot{q} = a_T;$$

where, $J_T$ is a Jacobian matrix corresponding to the trunk posture of the humanoid robot, $\dot{J}_T$ is a derivative of the Jacobian matrix $J_T$, $\dot{q}$ is a feedback joint angular velocity of the humanoid robot, $\ddot{q}$ is the joint angular acceleration of the humanoid robot, and $a_T$ is the trunk posture acceleration calculated using the trunk acceleration control law; and the trunk acceleration control law satisfies an equation of:

$$a_{T,d} = a_{T,ref} + K_{p3}(r_{T,ref} - r_T) + K_{d3}(v_{T,ref} - v_T);$$

where, $a_{T,d}$ is an expected trunk posture acceleration, $a_{T,ref}$ is a planned trunk posture feedforward acceleration, $r_{T,ref}$ is a planned trunk posture, $v_{T,ref}$ is a planned trunk posture velocity, $r_T$ an actual feedback trunk posture, $v_T$ is an actual feedback trunk posture velocity, and $K_{p3}$ and $K_{d3}$ are the coefficient matrices.

16. A non-transitory computer-readable storage medium for storing one or more computer programs, wherein the one or more computer programs comprise:
  instructions for obtaining a task equation of each of a plurality of deconstructed tasks in a corresponding control cycle of a humanoid robot by solving a plurality of deconstructed task models of the humanoid robot using a relevant actual state and a corresponding expected state of the humanoid robot, wherein the relevant actual state is fed back, by the humanoid robot, in the corresponding control cycle;
  instructions for calculating an optimal solution of a multi-task error optimization function based on the task equation of each of the deconstructed tasks, wherein the multi-task error optimization function is constructed based on all the deconstructed task models and an assigned weight of each of the deconstructed tasks and has one or more constraints that the humanoid robot needs to meet when executing each of the deconstructed tasks; and
  instructions for generating a joint control instruction of the corresponding control cycle based on the optimal solution in response to the optimal solution being obtained within the corresponding control cycle, and executing the deconstructed task corresponding to the joint control instruction by transmitting the joint control instruction to a corresponding joint of the humanoid robot to move the joint;
  wherein the humanoid robot has four deconstructed tasks including a sole pose task, a linear momentum task, a trunk posture task and a sole force task each has a deconstructed task model; and wherein the deconstructed task model of the sole pose task is constructed in advance by:
  constructing a sole acceleration control law related to a sole pose deviation and a sole velocity deviation of the humanoid robot, wherein the sole acceleration control law is for calculating a sole acceleration, the sole pose deviation is a difference between a planned sole pose and an actual feedback sole pose, and the sole velocity deviation is a difference between a planned sole velocity and an actual feedback sole velocity; and
  constructing a first kinematics equation satisfied between the sole acceleration and a joint angular acceleration of the humanoid robot, obtaining the deconstructed task model of the sole pose task by representing the first kinematics equation in a preset form, wherein the joint angular acceleration and the sole force are represented as a to-be-optimized variable in the preset form.

17. The non-transitory computer-readable storage medium of claim 16, wherein the first kinematics equation is:

$$J_F \ddot{q} + \dot{J}_F \dot{q} = a_F;$$

where, $J_F$ is a Jacobian matrix corresponding to a sole of the humanoid robot, $\dot{J}_F$ is a derivative of the Jacobian matrix $J_F$, $\dot{q}$ is a feedback joint angular velocity of the humanoid robot, $\ddot{q}$ is an angular acceleration of each joint of the humanoid robot, and $a_F$ is a sole acceleration calculated using the sole acceleration control law; and wherein, the sole acceleration control law satisfies an equation of:

$$a_{F,d} = a_{F,ref} + K_{p1}(r_{F,ref} - r_F) + K_{d1}(V_{F,ref} - v_F);$$

where, $a_{F,d}$ is an expected sole acceleration, $r_{F,ref}$ is a planned sole feedforward acceleration, $r_{F,ref}$ is a planned sole pose, $v_{F,ref}$ is a planned sole velocity, $r_F$ is an actual feedback sole pose, $v_F$ is an actual feedback sole velocity, and $K_{p1}$ and $K_{d1}$ are coefficient matrices.

18. The non-transitory computer-readable storage medium of claim 16, wherein the deconstructed task model of the linear momentum task is constructed in advance by:
  constructing a linear momentum control law related to a combined centroid position deviation and combined centroid velocity deviation of the humanoid robot, wherein the linear momentum control law is for calculating a linear momentum derivative of the humanoid robot, the combined centroid position deviation is a difference between a planned combined centroid position and an actual feedback combined centroid position, and the combined centroid velocity deviation is a difference between a planned combined centroid velocity and an actual feedback combined centroid velocity; and
  constructing a linear momentum equation satisfied between the linear momentum derivative and the joint angular acceleration of the humanoid robot, and obtaining the deconstructed task model of the linear momentum task by representing the linear momentum equation in the preset form.

19. The non-transitory computer-readable storage medium of claim 18, wherein the deconstructed task model of the linear momentum task is as an equation of:

$$\dot{h}_l = A_{G,l} \ddot{q} + \dot{A}_{G,l} \dot{q};$$

where, $A_{G,l}$ is a momentum matrix, $\dot{A}_{G,l}$ is a derivative of the momentum matrix, $\ddot{q}$ is the joint angular acceleration of the humanoid robot, $\dot{q}$ is a feedback joint angular velocity of the humanoid robot, $\dot{h}_l$ is the linear momentum derivative of the humanoid robot calculated using the linear momentum control law; and wherein the linear momentum control law satisfies an equation of:

$$\dot{h}_{l,d} = \dot{h}_{l,ref} + K_{p2}(r_{CoM,ref} - r_{CoM}) + K_{d2}(v_{CoM,ref} - v_{CoM});$$

where, $\dot{h}_{l,d}$ is an expected linear momentum derivative, $\dot{h}_{l,ref}$ is a planned feedforward amount of linear momentum derivative, $r_{CoM,ref}$ is a planned combined centroid position of the humanoid robot, and $v_{CoM,ref}$ is a planned combined centroid velocity of the humanoid robot, $r_{CoM}$ is an actual feedback combined centroid position, $v_{CoM}$ is an actual feedback combined centroid velocity, and $K_{p2}$ and $K_{d2}$ are coefficient matrices.

20. The non-transitory computer-readable storage medium of claim 16, wherein a trunk posture of the humanoid robot is represented by a state of a plurality of virtual joints constructed between a trunk of the humanoid robot and a world coordinate system origin, and the deconstructed task model of the trunk posture task is constructed in advance by:

constructing a trunk acceleration control law related to a trunk posture deviation and a trunk posture velocity deviation of the humanoid robot, wherein the trunk acceleration control law is for calculating a trunk posture acceleration, the trunk posture deviation is a difference between a planned trunk posture and an actual feedback trunk posture, and the trunk posture velocity deviation is a difference between a planned trunk posture velocity and an actual feedback trunk posture velocity; and constructing a second kinematics equation satisfied between the trunk posture acceleration and the joint angular acceleration of the humanoid robot, and obtaining the deconstructed task model of the trunk posture task by representing the second kinematics equation in the preset form.

\* \* \* \* \*